Patented Feb. 9, 1954

2,668,806

UNITED STATES PATENT OFFICE 2,668,806

SUSPENSION POLYMERIZATION PROCESS

Robert N. Haward and Joyce Elly, Trafford Park, Manchester, England, assignors, by mesne assignments, to Styrene Products Limited, London, England No Drawing. Application December 10, 1951, Serial No. 260,947

Claims priority, application Great Britain December 21, 1950

16 Claims. (Cl. 260—45.5)

This invention relates to the suspension polymerisation process used for the polymerisation of unsaturated organic compounds which contain a $CH_2C<$ group in the molecule, i. e. compounds which contain a vinyl or vinylidene radical in the molecule.

In the polymerisation of unsaturated organic compounds by the suspension process, the compound or mixture of compounds to be polymerised is dispersed in the liquid phase, and is maintained in suspension during the polymerisation reaction, in an aqueous medium by agitation. No emulsifying or the like agent is added but it has been found necessary to add suspension stabilisers in the form of finely divided solid particles in order to obtain the product in the desired form of beads or pearls.

Various inorganic substances have been proposed as suspension stabilisers. For example, talc, clay and barium sulphate, and more recently tri-calcium phosphate and also a calcium phosphate having a $CaO/P_2O_5$ ratio by weight of at least 1.35 have been suggested for this purpose.

Though the calcium phosphates have proved outstandingly successful, particularly in the suspension polymerisation of styrene and mixtures containing a predominant proportion of styrene, certain modifications of the suspension system are on occasions required in order to insure consistent results.

A considerable amount of research has been carried out in order to find what may be termed a "general purpose" stabiliser, i. e. one whose effectiveness will not be unduly affected by slight variations of the conditions under which the polymerisation is carried out and which will give satisfactory results with a minimum of control even for suspension polymerisations which have hitherto proved troublesome, e. g. the suspension polymerisation of styrene together with a cross-linking agent such as divinylbenzene and the suspension polymerisation of styrene in the presence of rubber.

It has now been found that calcium oxalate fulfils the requirements of a "general purpose" stabiliser more effectively than any of the stabilisers hitherto proposed and is particularly effective in the suspension polymerisation of styrene in the presence of rubber for the production of high impact strength polystyrenes.

The invention thus consists in a suspension polymerisation process for the polymerisation of unsaturated organic compounds which contain a $CH_2C<$ group in the molecule in which a substantially neutral calcium oxalate is used as suspension stabiliser.

A calcium oxalate suitable for use in the process of the invention may be prepared by running a solution of oxalic acid into a dispersion of pure lime until the product is neutral. After filtration and drying the powder is suitable for use as a suspension stabiliser.

Commercially available forms of pure calcium oxalate have also been found satisfactory for use in the process of the invention. The calcium oxalate must, however, be substantially neutral, i. e. a 1% by weight suspension in distilled water should have a pH value between 5 and 9 and preferably between 6 and 8.

The calcium oxalate may be used in an amount of from 0.1 to 2.5% and preferably from 0.2 to 1.0% by weight of the total system of water and monomer or monomers.

High ratios of monomer or mixture of monomers to water may be successfully used in the process of the invention and in general the ratio by volume of monomer to water may be from 1:3 to 3:2.

The polymerisation process of the invention is preferably carried out with the aid of one or more monomer-soluble polymerisation catalysts such as, for example, benzoyl peroxide and tertiary butyl perbenzoate, and at a temperature of from about 80 to 120° C., though the temperature may be raised to up to 150° C. at the end of the reaction.

The process of the invention may be applied with particular advantage to the production of high impact-strength polystyrenes by the polymerisation of styrene in the presence of a natural or synthetic rubber. The invention provides a successful suspension polymerisation process for the production of high impact-strength polystyrenes which process comprises the polymerisation of styrene containing in solution a minor proportion of rubber, in aqueous suspension in the presence of suspended, finely divided particles of a substantially neutral calcium oxalate. The rubber used may be a natural rubber which has been extracted with a solvent or a synthetic rubber which has been treated to remove substantially any soap or emulsifying agent which is present. The rubber may constitute from 2 to 30% by weight of the solution of rubber in styrene.

The process of the invention may also be applied with advantage to the copolymerisation of styrene with a cross-linking agent (i. e. a compound containing at least two CH₂C< groups) such as divinylbenzene.

An example of a method of preparation of a calcium oxalate suitable as a stabiliser for use in the present invention is described in Example 1 and polymerisation processes carried out in accordance with the invention are described in Examples 2 to 7 below.

*Example 1*

25.5 gms. of pure lime were dispersed in 2,500 ccs. of water at 80° C. and 54 gms. of pure crystalline oxalic acid were dissolved in 1,700 ccs. cold water and the solution was run into the lime dispersion until the product was neutral. The powder obtained after filtration and drying was used as a suspension stabiliser in the following examples.

*Example 2*

220 ccs. of demineralised water and 220 ccs. of styrene containing 0.44 gm. of benzoyl peroxide were stirred in a 500 cc. flask, fitted with a reflux condenser, at 90° C. until the styrene was dispersed in the water.

2.1 gms. of calcium oxalate powder were passed through a 200 mesh sieve and added to the stirred mixture. Stirring was then continued for 12 hours at the temperature of 90° C. when hard beads of polystyrene were obtained. The beads were washed with dilute acid to dissolve any adhering calcium oxalate and then with water to obtain an acid free product which was dried.

*Example 3*

110 ccs. of methyl methacrylate containing 0.11 gm. of benzoyl peroxide were stirred with 330 ccs. demineralised water in a 500 cc. flask, fitted with a reflux condenser, at 80° C.

2.1 gms. of calcium oxalate powder prepared as described above were passed through a 200 mesh sieve and added to the stirred mixture. Stirring was continued at the temperature of 80° C. for 7 hours. Hard beads of poly-methylmethacrylate were obtained and were washed with acid and water and dried as described in the previous example.

*Example 4*

160 gms. of a mixture of 90% by weight of styrene and 10% by weight of acrylonitrile plus 0.32 gm. of benzoyl peroxide were stirred with 240 ccs. of demineralised water in a 500 cc. flask, fitted with a reflux condenser, at a temperature of 85° C. After 15 minutes 2.1 gms. of calcium oxalate, prepared as described in Example 1 and passed through a 200 mesh sieve, were added. Stirring was continued for the first 15 hours, the temperature being maintained at 85° C. for the first 2 hours, 90° C. for the following 4 hours and 95° C. for the final 9 hours. Hard beads of a copolymer were obtained and were washed with acid and water and dried in the usual manner.

*Example 5*

50 gms. of pale crepe rubber were placed in a Soxhlet apparatus and extracted with ethyl alcohol for 4 hours. This process removed some of the surface active material from the rubber. The rubber was then boiled with water for ½ an hour to remove the alcohol and dried overnight at 90° C.

The rubber was further cold milled on rolls to reduce the viscosity to a specific viscosity of 1.18 in 0.11% by weight solution in toluene.

22 gms. of the rubber were then dissolved in 220 ccs. styrene together with 0.47 gm. of benzoyl peroxide.

220 ccs. of this solution were then added to an equal volume of water stirred at 840 revs./min. with a V stirrer in a 500 cc. flask, which was fitted with a reflux condenser and heated to 92° C. 5 minutes after the addition of the styrene solution, 5.04 gms. of calcium oxalate powder, which had been passed through a 200 mesh sieve, were added to the stirred mixture.

Stirring was continued for 12 hours at 92° C., followed by 7 hours at 100° C. Hard pearls were obtained which were cleaned by acidification and washing.

The dry pearls were injection moulded to give a rectangular test piece which was notched and broken in a small Charpy type impact machine.

The impact strength obtained was 1.18 kg. cm. (average of 10 tests). With ordinary polystyrene an impact strength of 0.3 kg. cm. was obtained under similar test conditions.

This example was repeated using acetone to extract the rubber and similar results were obtained.

*Example 6*

A GR-S type rubber was prepared by polymerisation of 25 parts by weight styrene with 75 parts by weight butadiene in emulsion for 8 hours at 50° C. 2% dodecyl mercaptan by (weight based on the hydrocarbon) was added in order to produce a soluble rubber.

About 150 ccs. of the resulting latex (corresponding to 50 gms. hydrocarbon) was then cooled and treated with saturated sodium chloride until precipitation was complete. The product was then boiled five times with 200 ccs. distilled water to remove soap until a sintered glass bubbler injected in the solution gave little frothing. The resultant polymer was dried for 48 hours at 50° C.

16.5 gms. of the rubber polymer obtained were then dissolved in 220 ccs. of styrene together with 0.69 gm. of benzoyl peroxide. The solution was then added to an equal quantity of water stirred at 840 revs./min. with a V stirrer in a 500 cc. flask, fitted with a reflux condenser and heated to 90° C. After 5 minutes, 4.5 gms. of calcium oxalate powder which had been passed through a 200 mesh sieve, were added and after 3 hours a further 0.23 gm. of solid benzoyl peroxide was added.

Stirring was continued for 18 hours at 90° C. when fine, hard, rubberised polystyrene pearls were obtained.

The pearls were moulded and tested for impact-strength in accordance with British Standard Specification 1493 of 1948. A value of 0.40 ft. lbs. was obtained. This is about double the value obtained for ordinary polystyrene.

*Example 7*

A mixture of 114 ccs. of styrene and 28 ccs. of divinylbenzene concentrate containing 0.6 gm. of benzoyl peroxide were stirred (800 revs./min. with a V stirrer) with 220 ccs. of demineralised water in a 500 cc. flask fitted with a reflux condenser and heated to 88° C.

After 15 minutes, 1.5 gms. of calcium oxalate powder which had been passed through a 200 mesh sieve were added together with 0.0035 gm. gelatin dissolved in a few ccs. of water. Stirring was continued for 6 hours at 90° C. when hard pearls of the copolymer were obtained. Similar results were obtained without the addition of gelatin but the pearls in this case were not quite so uniformly sized.

The divinylbenzene concentrate used had the following composition:

| | Per cent by weight |
|---|---|
| Divinylbenzene | 48.0 |
| Ethyl vinyl benzene | 42.1 |
| Diethyl benzene | 9.1 |
| Naphthalene | 0.5 |
| Tertiary butyl catechol (inhibitor) | 0.1 |

Its Bromine No. was 167.7.

We claim:

1. A process for the suspension polymerisation of styrene which comprises polymerising styrene in aqueous suspension in the presence, as a suspension stabilizer, of suspended, finely divided particles of a substantially neutral calcium oxalate.

2. A process for the suspension polymerisation of styrene together with a minor proportion of another unsaturated organic compound containing a $CH_2C<$ group in the molecule which comprises polymerising a mixture of styrene with said another organic compound in aqueous suspension in the presence, as a suspension stabilizer, of suspended, finely divided particles of a substantially neutral calcium oxalate.

3. A process for the suspension polymerisation of styrene together with a minor proportion of divinylbenzene which comprises polymerising a mixture of styrene and divinylbenzene in aqueous suspension in the presence, as a suspension stabilizer, of suspended, finely divided particles of a substantially neutral calcium oxalate.

4. A process as claimed in claim 3 in which the said divinylbenzene is in the form of a divinylbenzene concentrate containing about 48% by weight of divinylbenzene.

5. A process for the production of a high impact-strength polystyrene which comprises polymerizing styrene containing in solution therein a minor proportion of rubber in aqueous suspension in the presence, as a suspension stabilizer, of suspended, finely divided particles of a substantially neutral calcium oxalate.

6. A process as claimed in claim 5 in which the said rubber is a synthetic rubber.

7. A process as claimed in claim 5 in which the rubber constitutes from about 2 to 30% by weight of the solution of rubber in styrene.

8. In the suspension polymerization of unsaturated organic compounds which contain a $CH_2C<$ group in the molecule and are capable of being polymerized in the liquid phase, the process which comprises polymerizing at least one such unsaturated compound in aqueous suspension in the presence, as a suspension stabilizer, of suspended, finely divided particles of a substantially neutral calcium oxalate.

9. A process as claimed in claim 8 in which the calcium oxalate constitutes from 0.1 to 2.5% by weight of the whole system.

10. A process for the suspension polymerization of styrene which comprises polymerizing styrene containing in solution a polymerization catalyst therefor, at a temperature of from about 80 to 120° C. in aqueous solution in the presence, as a suspension stabilizer, of suspended, finely-divided particles of a substantially neutral calcium oxalate, the ratio of the monomer styrene to water in the suspenion being from 1:1 to 3:2 by volume and the amount of calcium oxalate present in the suspension being from 0.1 to 1% by weight of the whole system.

11. A process for the suspension polymerization of styrene together with a minor proportion of another unsaturated organic compound containing a $CH_2C<$ group in the molecule which comprises polymerizing a mixture of styrene with said other organic compound in aqueous suspension at a temperature of from about 80 to 120° C., in the presence of a polymerization catalyst for, and soluble in styrene and, as a suspension stabilizer, of suspended, finely-divided particles of a substantially neutral calcium oxalate, the ratio of monomers to water in the suspension being from 1:3 to 3:2 by volume and the amount of calcium oxalate present in the suspension being from 0.1 to 1% by weight of the whole system.

12. A process for the production of high-impact strength polystyrene which comprises polymerizing, at a temperature of from about 80 to 120° C., styrene containing in solution therein a minor proportion of rubber and a styrene polymerization catalyst, in aqueous suspension in the presence, as a suspension stabilizer, of suspended, finely-divided particles of a substantially neutral calcium oxalate, the ratio of styrene solution to water in the suspension being from 1:3 to 3:2 by volume and the amount of calcium oxalate present in the suspension being from 0.1 to 2.5% by weight of the whole system.

13. A process as claimed in claim 12 in which the rubber constitutes from 2 to 30% by weight of the solution of rubber in styrene.

14. A process as claimed in claim 12 in which the said rubber is a synthetic rubber.

15. A process for the suspension polymerization of styrene together with a minor proportion of divinylbenzene which comprises polymerizing at a temperature of from about 80 to 120° C. a mixture of styrene and divinylbenzene containing in solution therein a styrene polymerization catalyst, in aqueous suspension in the presence, as a suspension stabilizer, of suspended, finely-divided particles of a substantially neutral calcium oxalate, the ratio of monomers to water in the suspension being from 1:3 to 3:2 by volume and the amount of calcium oxalate present in the suspension being from 0.1 to 1% by weight of the whole system.

16. A process as claimed in claim 15 in which the divinylbenzene is in the form of a divinylbenzene concentrate containing about 48% by weight of divinylbenzene.

ROBERT N. HAWARD.
JOYCE ELLY.

References Cited in the file of this patent

UNITED STATES PATENTS

| Number | Name | Date |
|---|---|---|
| 2,473,549 | Smith | June 21, 1949 |